US010135780B1

(12) United States Patent
Troper et al.

(10) Patent No.: US 10,135,780 B1
(45) Date of Patent: *Nov. 20, 2018

(54) MANAGEMENT OF COMMERCIAL MESSAGES IN A SOCIAL NETWORK

(71) Applicant: Google Inc., Mountain View, CA (US)

(72) Inventors: Dennis Troper, Los Altos, CA (US); Pavan Desikan, Palo Alto, CA (US); Michael Nestler, Menlo Park, CA (US); Amar Gandhi, Mountain View, CA (US); Brynn Evans, Los Altos, CA (US); Karthik M. Nagaraj, Livermore, CA (US); Jean-Christophe E. Lilot, Mountain View, CA (US); David Besbris, Mountain View, CA (US); Jonathan Terleski, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/131,806

(22) Filed: Apr. 18, 2016

Related U.S. Application Data

(63) Continuation of application No. 13/667,747, filed on Nov. 2, 2012, now Pat. No. 9,319,371.

(60) Provisional application No. 61/556,149, filed on Nov. 4, 2011.

(51) Int. Cl.
*G06F 15/16* (2006.01)
*H04L 12/58* (2006.01)
*G06Q 50/00* (2012.01)
*H04L 29/08* (2006.01)

(52) U.S. Cl.
CPC ............ *H04L 51/32* (2013.01); *G06Q 50/01* (2013.01); *H04L 67/22* (2013.01); *H04L 67/306* (2013.01)

(58) Field of Classification Search
CPC ....... H04L 51/32; H04L 67/22; H04L 63/101; G06Q 50/01; G06Q 10/10; G06Q 20/382; G06Q 10/107; G06F 17/30
USPC ................ 709/204–206, 223, 200; 707/622; 718/104
See application file for complete search history.

(56) References Cited

U.S. PATENT DOCUMENTS

| 5,796,393 A | * | 8/1998 | MacNaughton | .... G06F 17/3089 707/E17.116 |
| 6,020,884 A | * | 2/2000 | MacNaughton | .... G06F 17/3089 707/E17.116 |

(Continued)

*Primary Examiner* — El Hadji Sall
(74) *Attorney, Agent, or Firm* — Lowenstein Sandler LLP

(57) ABSTRACT

Methods, systems, and computer programs are presented for managing the flow of messages among users of a social network. One method enables the election of an entity in the social network by a person in the social network. The election indicates that the person follows the entity to receive entity electronic messages. Further, an election of the person by the entity is disabled until it is detected that the person has elected to follow the entity. Additionally, the method includes an operation for detecting the election of the entity by the person, where the person is enabled to add the entity to communication groups managed by the person after the election. The entity is enabled to follow the person after the person elects to follow the entity, and messages from the person to communication groups including the entity will reach the entity.

20 Claims, 14 Drawing Sheets

(56) References Cited

U.S. PATENT DOCUMENTS

| | | | |
|---|---|---|---|
| 6,433,795 B1* | 8/2002 | MacNaughton | G06F 17/3089 707/E17.116 |
| 6,480,885 B1* | 11/2002 | Olivier | H04L 12/1859 709/202 |
| 7,159,178 B2* | 1/2007 | Vogt | G06Q 10/10 709/203 |
| 7,167,910 B2* | 1/2007 | Farnham | G06F 3/0481 709/206 |
| 8,015,484 B2* | 9/2011 | Backer | G06F 17/30867 715/234 |
| 8,291,492 B2* | 10/2012 | McNally | G06Q 10/063 705/14.2 |
| 8,312,276 B2* | 11/2012 | Chiou | G06Q 10/10 380/30 |
| 8,504,421 B2* | 8/2013 | Rosenberger | G06Q 30/02 705/14.4 |
| 8,527,450 B2* | 9/2013 | Jain | G06N 5/025 706/12 |
| 8,645,396 B2* | 2/2014 | McNally | G06Q 10/063 705/14.2 |
| 8,661,009 B2* | 2/2014 | Hamilton | G06F 17/30867 707/705 |
| 8,676,833 B2* | 3/2014 | Chunilal | G06F 17/30867 707/769 |
| 8,719,352 B2* | 5/2014 | Krasser | G06F 21/552 709/203 |
| 8,782,217 B1* | 7/2014 | Arone | H04W 12/08 709/224 |
| 8,812,392 B2* | 8/2014 | Shahghasemi | G06Q 20/22 705/37 |
| 8,812,404 B2 | 8/2014 | Aleong et al. | |
| 8,850,191 B2* | 9/2014 | Everhart | G06F 21/33 713/158 |
| 8,880,600 B2* | 11/2014 | Lento | G06Q 10/10 455/435.1 |
| 8,935,275 B2* | 1/2015 | Rathod | G06F 17/30867 707/609 |
| 8,949,343 B2* | 2/2015 | Shen | G06Q 10/107 709/206 |
| 9,002,858 B1* | 4/2015 | Dassa | G06Q 30/0202 705/319 |
| 9,407,594 B2* | 8/2016 | Altberg | G06Q 20/102 |
| 9,553,878 B2* | 1/2017 | Wu | H04L 63/101 |
| 2003/0182371 A1* | 9/2003 | Worthen | G06Q 10/10 709/204 |
| 2004/0054899 A1* | 3/2004 | Balfanz | G06Q 20/382 713/168 |
| 2005/0209999 A1* | 9/2005 | Jou | G06Q 10/00 |
| 2008/0021870 A1* | 1/2008 | Birnbaum | G06Q 10/10 |
| 2008/0182563 A1* | 7/2008 | Wugofski | G06Q 10/10 455/414.2 |
| 2008/0228735 A1* | 9/2008 | Kenedy | G06Q 40/00 |
| 2008/0250332 A1* | 10/2008 | Farrell | G06Q 10/10 715/753 |
| 2008/0256170 A1* | 10/2008 | Hayashi | H04L 67/306 709/201 |
| 2009/0070219 A1* | 3/2009 | D'Angelo | G06Q 10/10 705/14.56 |
| 2009/0117883 A1* | 5/2009 | Coffing | H04L 51/38 455/414.1 |
| 2009/0132655 A1* | 5/2009 | Behrens | G06F 21/6218 709/204 |
| 2009/0222348 A1* | 9/2009 | Ransom | G06Q 30/02 705/14.73 |
| 2010/0100495 A1* | 4/2010 | Maksimow | G06Q 50/01 705/319 |
| 2010/0191598 A1* | 7/2010 | Toennis | G06Q 30/02 705/14.36 |
| 2010/0191704 A1* | 7/2010 | Schwitters | G06Q 10/10 707/622 |
| 2010/0324990 A1* | 12/2010 | D'Angelo | G06Q 10/10 705/14.46 |
| 2010/0333019 A1* | 12/2010 | Oschwald | G06Q 30/02 715/810 |
| 2011/0010305 A1* | 1/2011 | Aleong | G06Q 10/10 705/319 |
| 2011/0038287 A1* | 2/2011 | Agarwal | H04L 12/5865 370/310 |
| 2011/0117878 A1* | 5/2011 | Barash | G08B 21/0211 455/404.2 |
| 2011/0162047 A1* | 6/2011 | Reeves | G06F 21/33 726/4 |
| 2011/0270751 A1* | 11/2011 | Csinger | G06F 21/40 705/42 |
| 2012/0042386 A1 | 2/2012 | Backer | |
| 2012/0102124 A1* | 4/2012 | Hansson | G06Q 30/02 709/206 |
| 2012/0143963 A1* | 6/2012 | Kennberg | G06Q 10/107 709/206 |
| 2012/0215604 A1* | 8/2012 | Canetto | G06Q 30/0214 705/14.16 |
| 2013/0006779 A1* | 1/2013 | Belluomini | G06Q 30/06 705/14.69 |
| 2013/0013516 A1* | 1/2013 | Hamilton | G06Q 40/02 705/75 |
| 2013/0054718 A1* | 2/2013 | Davies | H04L 12/6418 709/206 |
| 2013/0097241 A1* | 4/2013 | Ur | G06Q 10/10 709/204 |
| 2013/0110911 A1* | 5/2013 | Chow | G06Q 30/0263 709/203 |
| 2013/0159413 A1* | 6/2013 | Davis | H04L 29/0872 709/204 |
| 2013/0179510 A1* | 7/2013 | Hull | H04L 51/28 709/204 |
| 2013/0204954 A1* | 8/2013 | Kendall | G06Q 10/02 709/206 |
| 2013/0243342 A1* | 9/2013 | Houjou | G06F 17/30244 382/224 |
| 2014/0006142 A1* | 1/2014 | Gaudet | G06Q 50/01 705/14.45 |
| 2014/0108152 A1* | 4/2014 | Wu | G06Q 10/10 705/14.66 |
| 2014/0188681 A1* | 7/2014 | Shahghasemi | G06Q 20/22 705/37 |
| 2014/0207695 A1* | 7/2014 | Beekman | G06Q 40/00 705/319 |
| 2014/0250144 A1* | 9/2014 | Guzenda | H04L 67/327 707/769 |
| 2016/0180113 A1* | 6/2016 | Patton | G06F 21/6245 726/28 |

\* cited by examiner

MANAGEMENT OF COMMERCIAL MESSAGES IN A SOCIAL NETWORK

CLAIM OF PRIORITY

This application claims priority from U.S. Provisional Patent Application No. 61/556,149, filed Nov. 4, 2011, entitled "Management of Commercial Messages in a Social Network" and U.S. Non-Provisional patent application Ser. No. 13/667,747, filed Nov. 2, 2012, entitled "Management of Commercial Messages in a Social Network", both of which are incorporated herein by reference for all purposes.

BACKGROUND

The present disclosure relates to methods, systems, and computer programs for managing the flow of messages among users of a social network, and more particularly, for managing the flow of messages between persons and non-person entities.

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

SUMMARY

Embodiments provide methods, systems, and computer programs for managing the flow of messages among users of a social network. It should be appreciated that the present embodiments can be implemented in numerous ways, such as a process, an apparatus, a system, a device or a method on a computer readable medium. Several embodiments are described below.

In one embodiment, a method includes an operation for enabling the election of an entity account in the social network by a person account in the social network. The election indicates that the person account is following the entity account to receive electronic messages from the entity account. Further, an election of the person account by the entity account is disabled until it is detected that the person account has elected to follow the entity account. Additionally, the method includes an operation for detecting the election of the entity account by the person account, where the person account is enabled to add the entity account to one or more communication groups managed by the person account after the election. In response to detecting the election of the entity account, the entity account is enabled to follow the person account, and messages from the person account to communication groups including the entity account will reach the entity account.

These and other embodiments can include one or more of the following features:

Detecting an election of the person account by the entity account; and enabling the entity account to add the person account to communication groups managed by the entity account.

Enabling person accounts to search for person accounts and for entity accounts.

Enabling entity accounts to search for entity accounts; and disabling entity accounts to search for person accounts.

Detecting a post created by the person account that mentions the entity account; and enabling the entity account to respond to the post in response to detecting the post.

Detecting a post created by the person account without a mention to the entity account; and disabling the entity account to respond to the post in response to detecting the post unless the entity account is following the person account.

Detecting a deletion of the entity account from the person account; and removing the person account from the entity account in response to detecting the deletion.

Enabling electronic messages from the entity account related to message streams started before the deletion.

Detecting a new election by the person account of the entity account after the deletion; and adding the person account to communication groups of the entity account where the person account existed before the deletion.

In another embodiment, a method for managing the flow of messages among users of a social network includes an operation for enabling an endorsement operation in the social network, where the social network includes person accounts and entity accounts. An endorsement of an entity account by a person account increases a value of an endorsement counter associated with the entity account. Furthermore, a follow operation is enabled in the social network. In one embodiment, the follow operation is independent of the endorsement operation. Therefore, a user may choose to perform an endorsement, a follow operation, or both. A person account is enabled to start following an entity, and the entity account is disabled to follow the person account until the person account starts following the entity account. An endorsement of the entity account by the person account when the person account is not following the entity account maintains messaging disabled from the entity account to the person account, wherein at least one operation of the method is executed through a processor.

These and other embodiments can include one or more of the following features:

Detecting that the person account is following the entity account, where the person account is enabled to add the entity account to one or more communication groups managed when the person account is following the entity account.

Enabling the entity account to follow the person account when the person account is following the entity account.

Detecting an extended electronic message from the person account to the communication groups managed by the person account, where the extended electronic message does not extend through entity accounts.

Enabling a post endorsement operation to posts in a stream of the person account or the entity account.

Enabling a follow operation from the entity account to other entity accounts.

In yet another embodiment, a computer program embedded in a non-transitory computer-readable storage medium, when executed by one or more processors, for managing the flow of messages among users of a social network, comprises program instructions for enabling an election of an entity account in the social network by a person account in the social network. The election indicates that the person account follows the entity account to receive electronic messages from the entity account. The computer program further includes program instructions for disabling an election of the person account by the entity account until a detection that the person account has elected to follow the entity account. The computer program also includes program instructions for detecting the election of the entity account by the person account. The person account is enabled to add the entity account to one or more communication groups managed by the person account after the election, and after detecting the election, the entity account is enabled to elect the person account to follow the person account, where messages from the person account to groups including the entity account will reach the entity account.

These and other embodiments can include one or more of the following features.

Program instructions for enabling an endorsement operation, where an endorsement of an entity account by a person account increases a value of an endorsement counter associated with the entity account.

A computer program where an endorsement of the entity account by the person account when the person account is not following the entity account maintains communications disabled from the entity account to the person account.

Program instructions for detecting a post created by the person account that mentions the entity account; and program instructions for enabling the entity account to respond to the post in response to detecting the post.

In yet another embodiment, a method includes an operation for receiving, from a user, an interaction with an entity page indicating a change in the relationship with the entity page defined in a social graph of the user. Further, the method includes an operation for, in response to receiving the indication of the change in the relationship, modifying privileges of the entity page with respect to interactions with the user initiated by the entity, where at least one operation of the method is executed through a processor.

These and other embodiments can provide one or more of the following advantages: reduce the amount of undesired messages; provide better control on the flow of electronic messages; and automatically reduce or stop communications from an entity when the user stops following the entity.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for managing the flow of messages among users of a social network. It will be apparent, that the present embodiments may be practiced without some or all of these specific details.

Figure 1:
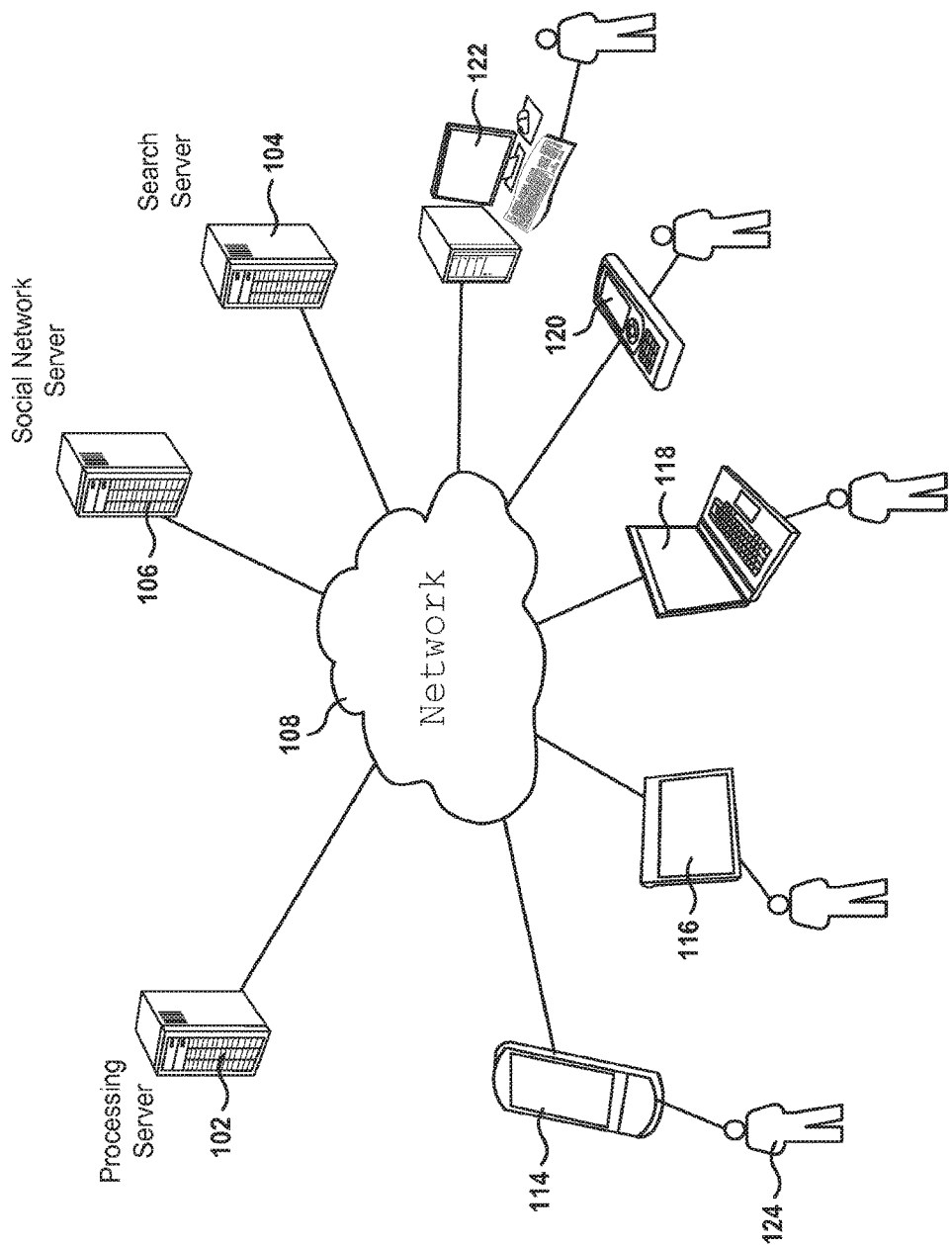
FIG. 1 provides one example architecture of a system that may utilize embodiments described herein.

FIG. 1 provides one example architecture of a system that may utilize embodiments described herein. Users 124 interact with each other in the context of a social network, where users include real people and entities. In one embodiment, entities perform interactive actions similar to people, although an entity may not be a person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name In addition, each account includes a profile of the user with additional information about the user, such as birth date, gender, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one embodiment, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one embodiment, the relationships established in the social network may be utilized in other contexts. Processing server 102 manages the electronic messages between persons and non-person entities, by enforcing rules related to electronic messages and/or actions within the social network. Search server 104 provides Internet search capabilities.

In one embodiment, the social network provides customizable controls that people may use to manage interactions and electronic messages with non-person entities. In one example, the logic executing the social network may define various services and controls. One example service is designed for real person users (e.g., people accounts). Another example service is designed for non-person entities (e.g., entity accounts). In one embodiment, a real person is an individual "person." The entity account of the entity, on the other hand, is similar to a user account of a person, however the services and controls may be different. As noted above, an entity may be a business, a famous person or figure, a commercial figure, an artist, a celebrity, a government group, a brand, a political figure, a community association, an organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, electronic messages, sharing, and generally interacting within the social network. In one embodiment, this interface for entities is referred to as an entity pages and can be indicated visually by a token, e.g., "+". followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person is always in control of her relationships with entities (e.g., entity pages). In one embodiment, interactions between person and entity require person approval (e.g., an addition of the entity page to the person's social network, or a mention by the person of the entity, which are discussed in more detail below). Otherwise, entity pages present a similar behavior as person pages, once the person has initiated engagement with the entity.

It is noted that the embodiments illustrated in FIG. 1 are exemplary. Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting, but rather exemplary or illustrative.

Figure 2:
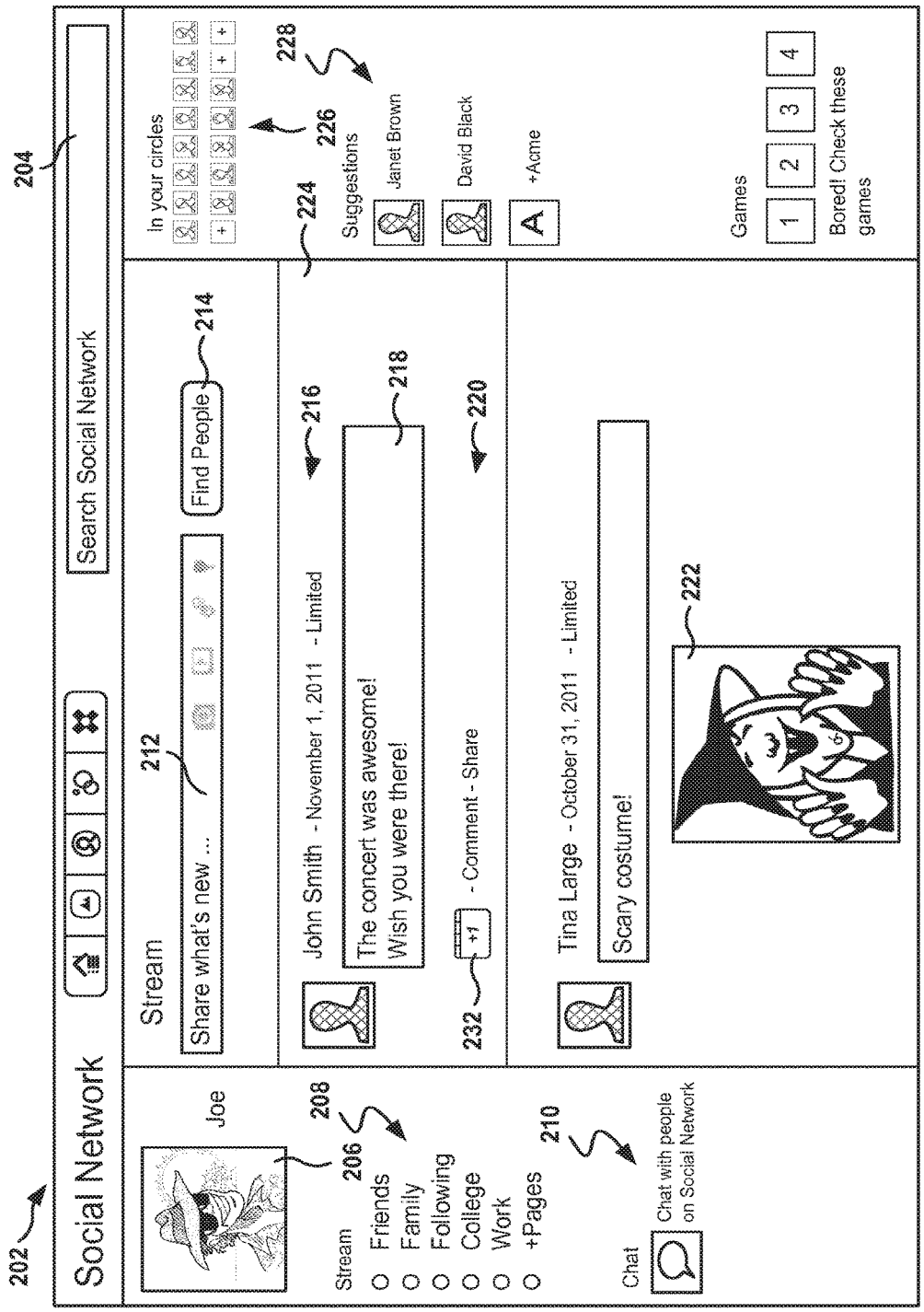
FIG. 2 is a person's web page for interfacing with a social network, according to one embodiment.

FIG. 2 is a person's web page for interfacing with a social network, according to one embodiment. For example, the person is shown logged into her user account. In one embodiment, posts received by a user are referred to as content of a stream in the social network. Page 202 is an example snapshot of a page for viewing a person's stream in the social network, and search field 204 is an input area for searching the social network or other content.

In one embodiment, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In one embodiment, the groups defined by the person are referred to as "circles," but other configurations for defining groups are also possible. Examples include various graphically designed interfaces or text based lists, dialog boxes, pull downs, radio buttons, and other interfaces defined from a combination of graphical elements, text, images, pictures, combinations thereof, etc. More details regarding the creation of circles are provided below with reference to FIG. 3. In one embodiment, the post may be a text message, a photo, a video, a link to a webpage, or a location of the person. Thus, the content and form of the post can include any data that can be presented, displayed, listened to, interfaced with, received, sent, shared, approved, or disapproved, etc.

In one embodiment, the stream includes posts added by the person, by others socially linked to the person, or by an entity that the person has chosen to follow (e.g., be linked with/to in the social network). In one embodiment, an entity may be restricted from posting to a person's stream, unless the person has established a social link with the entity beforehand, e.g., the person has chosen to follow the entity.

In one embodiment, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a √ (check) mark, a confirmation, a ratification, a validation, a seal of approval, a testimonial, support, advocacy, an approval, a ratification, etc. In one embodiment, a button is provided in various web pages to enable the person to provide his or her endorsement. See for example +1 button 232. The various web pages can be pages on accounts of the social network, on pages of third party web sites, on search pages, in lists of search results, etc. The +1 button 232 is provided, in one embodiment, as an icon that can be selected by the user. When selected, the count associated with the +1 button is displayed, so as to provide the user with information regarding the number of other users that may have selected the +1 button.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In one embodiment, the action of endorsing an entity in the social network does not cause the entity to be linked with the person in the social network. In another embodiment, for a link to be established in the social network between the person and the entity, a different operation is required where the person explicitly adds the entity to the person's social network. The explicit add can by performed by user selection on an interface, addition of an entity to one of their groups, e.g., circle, or selection of a button, icon, or some input control to follow the entity. The following can also be triggered automatically, based on the user's approval to take this action each time the user views, finds, selects, or interfaces with an account of an entity.

In one embodiment, a "mention" is an explicit reference to a user in a communication. A mention allows the creator of the post to grab someone's attention to a post because of the introduction of a mention identifier with, for example, someone's name In one embodiment, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one embodiment, the filtering options included radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one embodiment, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Embodiments of the disclosure allow people to be in control of social messages. For an entity to initiate communication with the person, the person has to first add explicitly the entity to its social network. In one embodiment, an entity is not able to initiate communications in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In one embodiment, the fact that the person endorses an entity does not enable the entity to freely initiate full communications or posts with the person. Of course, if the person and the entity are socially linked, the entity may initiate messaging with the person and post on the person's user account.

Figure 3:
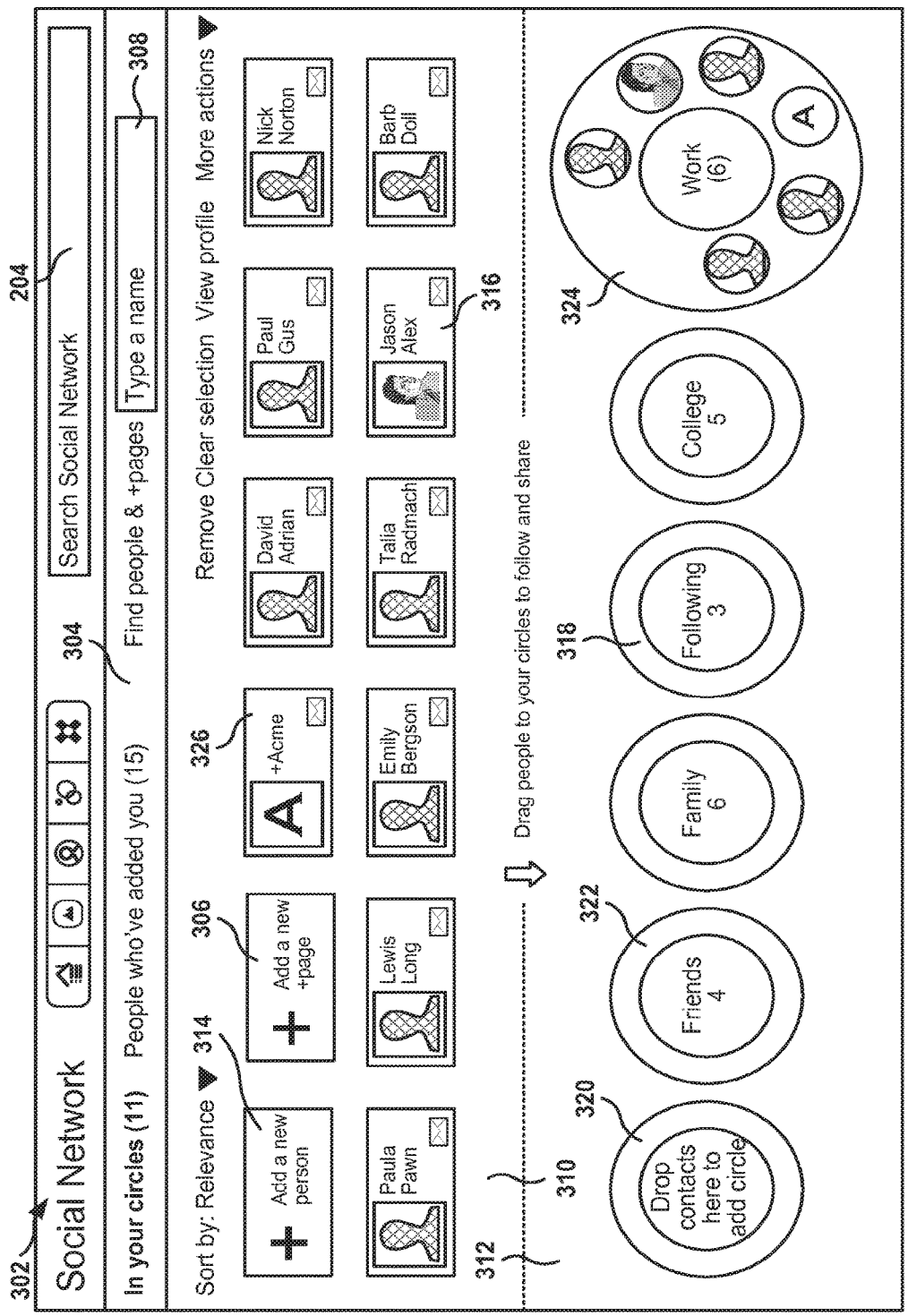
FIG. 3 is a web page for managing user groups within the social network, according to one embodiment.

FIG. 3 is a web page 302 for managing user groups within the social network, according to one embodiment. Bar 304 provides selections options for choosing users, which are then displayed in users area 310. In the embodiment shown in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities. In one embodiment, the social network provides an option to follow other users anonymously. If a person follows another user anonymously, the person will be able to see the public posts of the user, and the person or entity being followed would not be aware that this person is following them.

Users area 310 displays icons, images, pictures or indicators associated with several users, and circles area 312 includes the groups defined by the user. In one embodiment, the person is able to add users to the circles in circles area 312 by selecting a user icon, dragging the icon to the circles area 312, and dropping the icon in one of the circles. To delete a user from a circle, the user icon inside the circle is dragged from the circle and dropped outside the circle. In one embodiment, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, such as circle 322 named "Friends," are presented in a smaller size than circle 324 and do not show their contents. To create a new circle, the person can drop a user from users area 310 in circle 320.

In one embodiment, the social network creates a default circle for inclusion of entity pages. The embodiment of FIG. 3 provides a circle 318 named "Following" for inclusion of entity pages. The entity pages do not have to be added to circle 318, and may be added to any of the circles defined by the person. In one embodiment, persons and entities can also be added to more than one circle. In one embodiment, when a person starts following an entity, the entity is automatically added to the "Following" circle, although the person may later remove the entity or moving to another circle. In another embodiment, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326 "+Acme"). People are able to place real persons or entities in any of the circles below, and a circle may have just people, just entities, or a mix of people and entities.

In one embodiment, user area 310 also includes a couple of selection boxes for adding persons 314 or entities (e.g., entity pages) 306. When the person selects one of these boxes, options are presented to enter the name of a person or an entity, or to perform a search on the social network. In another embodiment, a unique box is presented to search for people or entities. In one embodiment, once the person enters a "+" sign as the first character of the search, the social network limits the search to entities. Otherwise, the search is limited to real persons. Again, it should be understood that any other symbol or token can be used to filter, identify or modify a search query.

Figure 4:
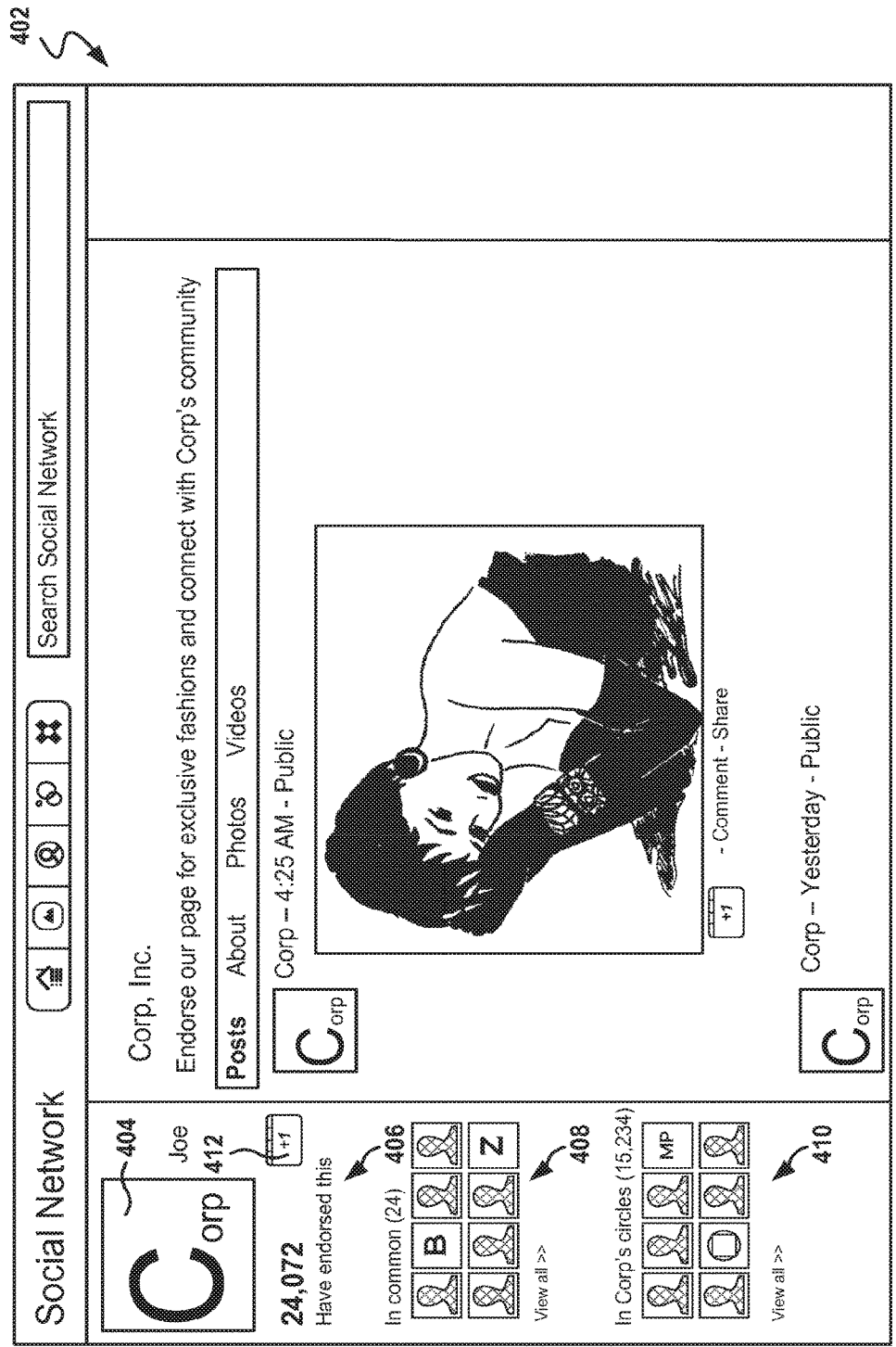
FIG. 4 shows a profile page of an entity in the social network, according to one embodiment.

FIG. 4 shows the profile page 402 of an entity in the social network, according to one embodiment. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 3.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In one embodiment, the profile page of a person may not include endorsement button 412. In another embodiment, the social network allows for the endorsement of real people, and an endorsement button is available to endorse people.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles.

In one embodiment, the social network enforces a privacy mechanic, e.g., a policy, to reduce undesired messages. In one embodiment, the policy defines two types of users: people and entities. The messaging rules in the social network are different for people and for entities. A person may initiate contact with an entity, but the entity may not initiate contact with the person. Once the person establishes a social link with the entity (e.g., the person adds the entity to one or more circles), then the entity may start communicating with the person. In one embodiment, an entity may initiate contact with other entities (of course, subject to user privacy settings), but not with real people (e.g., people accounts). This policy puts the person in command of the message flow between people and entities.

In one embodiment, the privacy policy defines that people may not have automatic acceptance of tags for photos posted on the social network by entities. However, there can be automatic acceptance of tags from entities by other entities.

Figure 5:
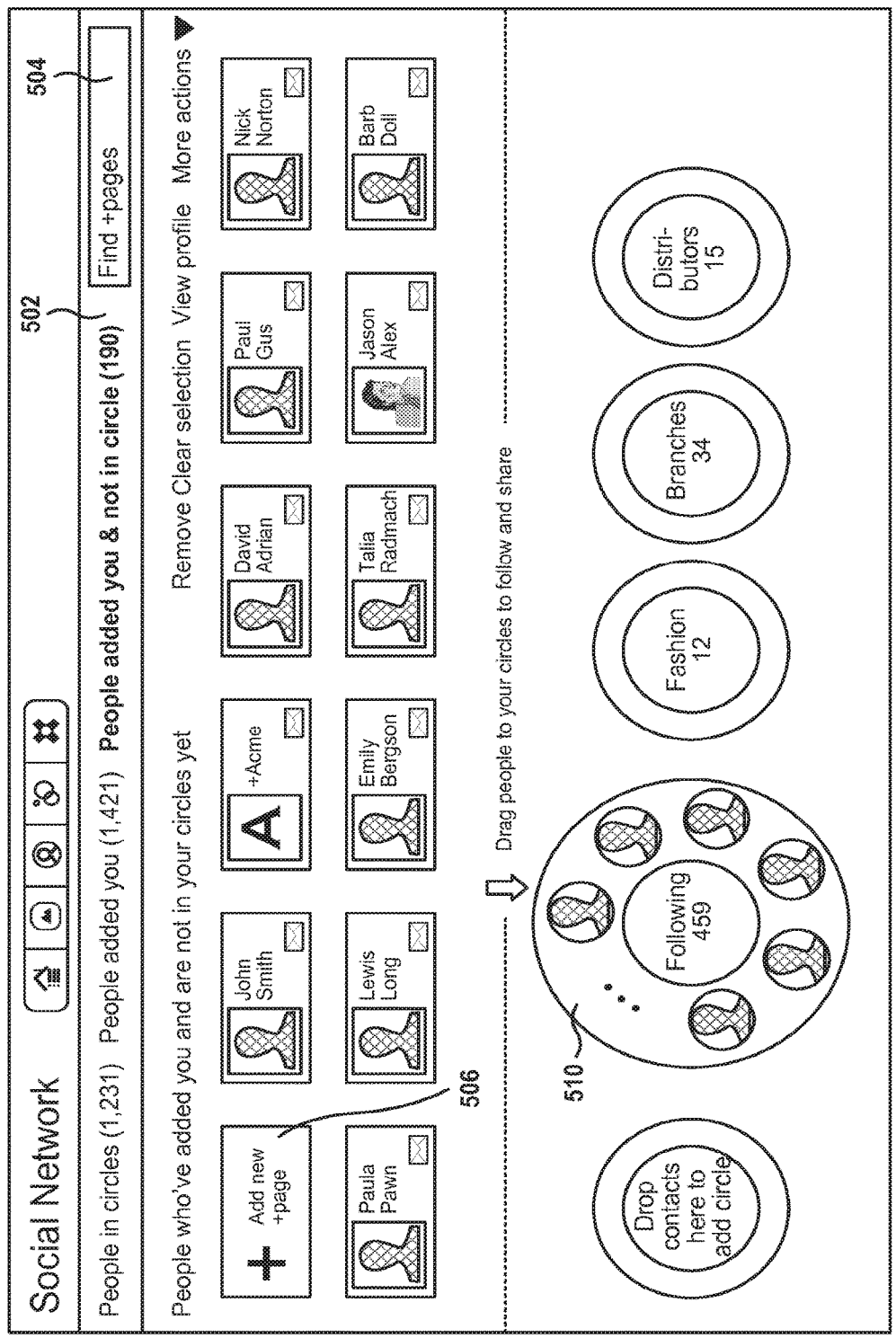
FIG. 5 is a web page for the management of user groups by an entity, according to one embodiment.

FIG. 5 is a web page for the management of user groups by an entity, according to one embodiment. Bar 502 for selecting users includes options for showing people already in the entity's circles, showing people that are following the entity, and showing people that are following the entity and not yet in a circle. The search box 504 is different from the search box 308 of FIG. 3 because an entity cannot search for people, or be allowed to find people to first approach. An entity may only search for other entities (e.g., entity pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In one embodiment, an entity may search for public information about people, but the entity is not enabled to add people found in the search to the entity's circles, unless, of course, a person found in the search is already following the entity. For example, if the intent of the search is to add new people to the entity's circles, as in the circle editor of FIG. 5, the social network disables the entity from finding new people to add to circles, by disallowing the people search in the circle editing page.

In one embodiment, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the embodiment of FIG. 5 illustrates a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 18-21 years old, 22-30, 31-50, and 51+). The number and type of circles (e.g., groups) created by the entity are limitless. The circles can be created for limited times, and people can be dynamically moved by the entity or an process set by the entity.

In one embodiment, the social network provides an automatic creation of circles, also referred to as suggested circles, based on the parameters selected by the entity and executed by the process, or based on user characteristics that are public or authorized by the user for use. Each suggested circle is associated with a respective one or more attributes, such as geographic location, language, country, etc. When a person first starts following an entity, the person is automatically added to the entity's suggested circles that match the person's characteristics. For example, a person is added to a circle for the city of San Jose if the person lives in San Jose, the person is added to a circle for ages from 10 to 20 if the person is 19 years old, the person is added to a circle for United States if the person lives in the United States, etc.

It is noted that each person is added to suggested circles when the person has provided the corresponding information to the social network (e.g., provided the information to the user profile) and the person has allowed the social network to use this or part of the information for selection of people to be added to the corresponding circles. In one embodiment, the content of the suggested circles is not available for inspection by the entity. This way, the entity does not receive information about the person, although the entity can target its marketing messages to the appropriate segments due to the infrastructure provided by the suggested circles.

The mechanic of suggested circles, in one embodiment, is transparent to people, and settable by administrative functions of the entity. For example a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In still another embodiment, the users that were added to the event circle can simply be copied (as a second instance) to the event circle. When the event is done, the event circle is deleted. The users, however, are still present in their previously defined circles of the entity.

In another embodiment, the suggested circles are administered by the entity because the social network provides information about the person to the entity (of course, the person's information (or only certain specific information) provided must be approved by the person). In one embodiment, the entity is able to manually assign people to suggested circles according to their characteristics in order to customize marketing communications or any other type of communication.

Figure 6:
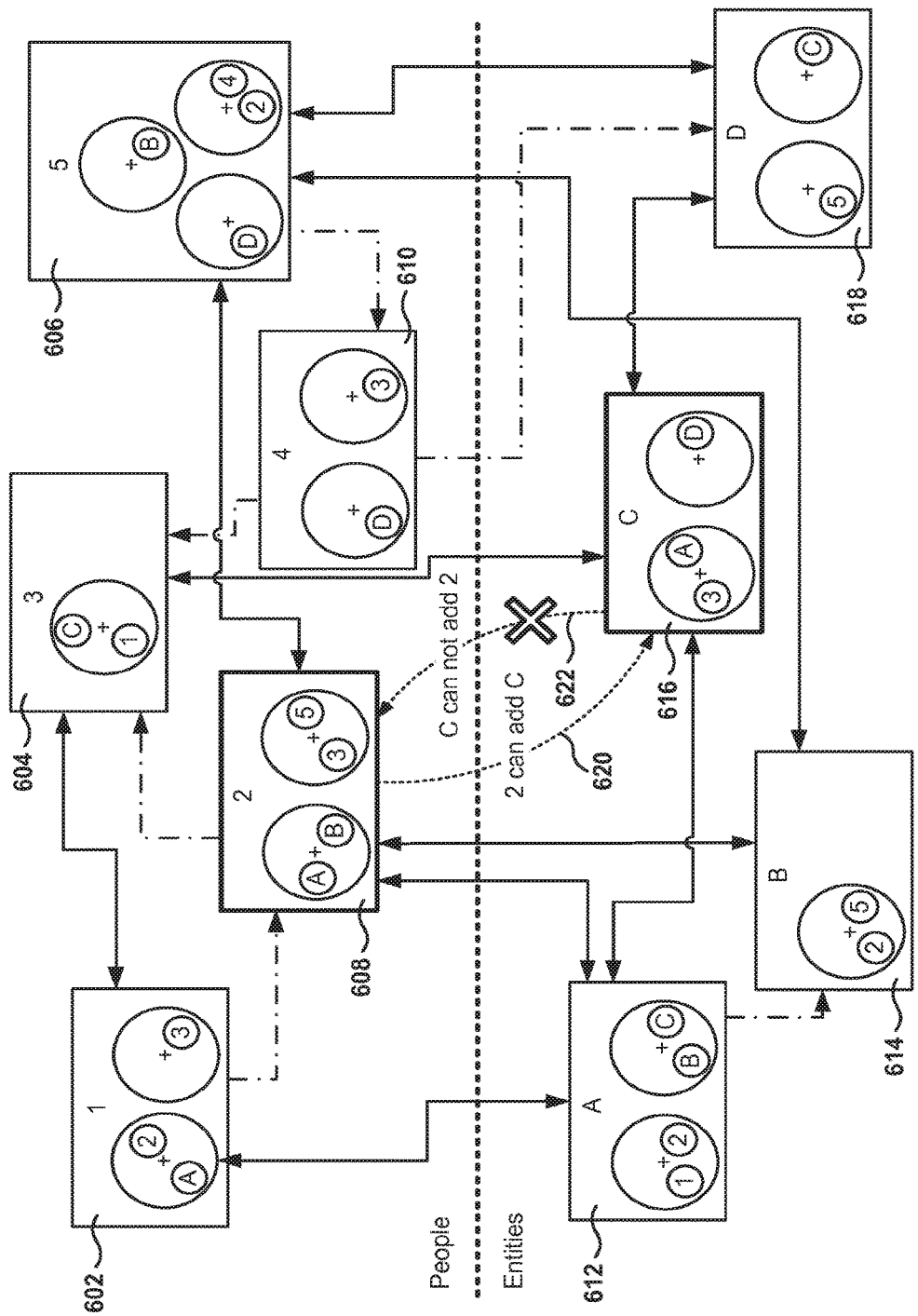
FIG. 6 illustrates the blocking of commercial messages from entities outside the person's social network, according to one embodiment.

FIG. 6 illustrates the blocking of commercial messages from entities outside the person's social network, according to one embodiment. FIG. 6 illustrates an example of the relationships between people 1-5 and entities A-D. for description purposes, people 602, 604, 606, 608, and 610 are situated at the top of the page, and entities 612, 614, 616, and 618 are situated at the bottom of the page.

Each user has defined one or more circles, and in each circle, one or more users have been included. The presence of a user in a circle means that the user is being followed by the owner of that circle. For example, person 2 608 has defined two circles: a first circle to follow entities A and B, and a second circle to follow persons 3 and 5.

A "follow" or "following" relationship defines that a "follower" receives messages from another user being followed. The "follow" relationships have been represented as arrows connecting users. A double arrow represents a reciprocal relationship, also referred to as mutual or shared relationship, where both users are following each other. A single arrow represents a non-reciprocal relationship, also referred to as a uni-directional or one-sided relationship, where the single arrow originates at the user following the other user where the arrow ends, but the reverse "follows" relationship is not present.

In the embodiment of FIG. 5, person 2 608 has no relationship with entity C 616. However, there is a difference between person 2 and entity C. Person 2 may add 620 entity C to its circles, but entity C may not add 622 person 2 to its circles, unless person 2 first starts following entity C. Once the entity gets the person's tacit approval, the interactions person-to-person are similar to the person-to-entity interactions (although there may be some differences in some embodiments, such as when computing the person's extended network, which is discussed in more detail below). This means that the entity page can show up in the person's circle editor, and in other touch points in the social network or outside the social network, such as in an Internet search page.

Figure 7:
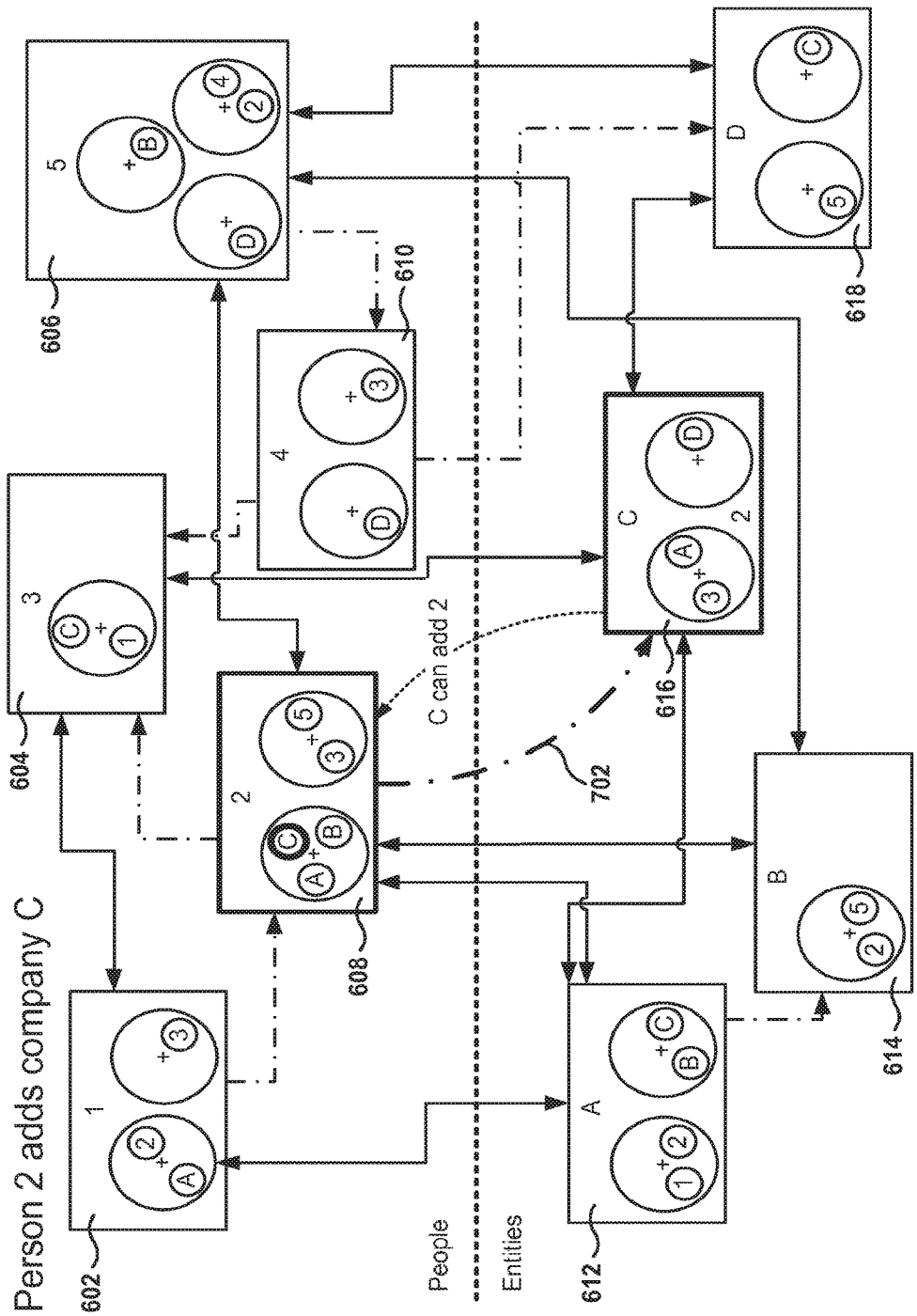
FIG. 7 illustrates the addition of an entity to the person's social network, according to one embodiment.

FIG. 7 illustrates the addition of an entity to the person's social network, according to one embodiment. FIG. 7 illustrates the relationships in the social network after person 2 608 added entity C 616. The new relationship is represented by "follow" arrow 702. Since person 2 has added C to her circles, entity C is now able to follow person 2 by adding person 2 to one or more of C's circles.

It is noted that if a person posts a photo to one or more of her circles, and there are some entities in those circles, the entities will be able to see the photo, even if the photo happens to be something personal, such as vacation pictures. The solution for the person is to manage the members of its circles, and not share personal information with circles that include entities. In one embodiment, a warning is given to the person before finalizing a post, if the post appears to be personal and the post will reach one or more entities.

Figure 8:
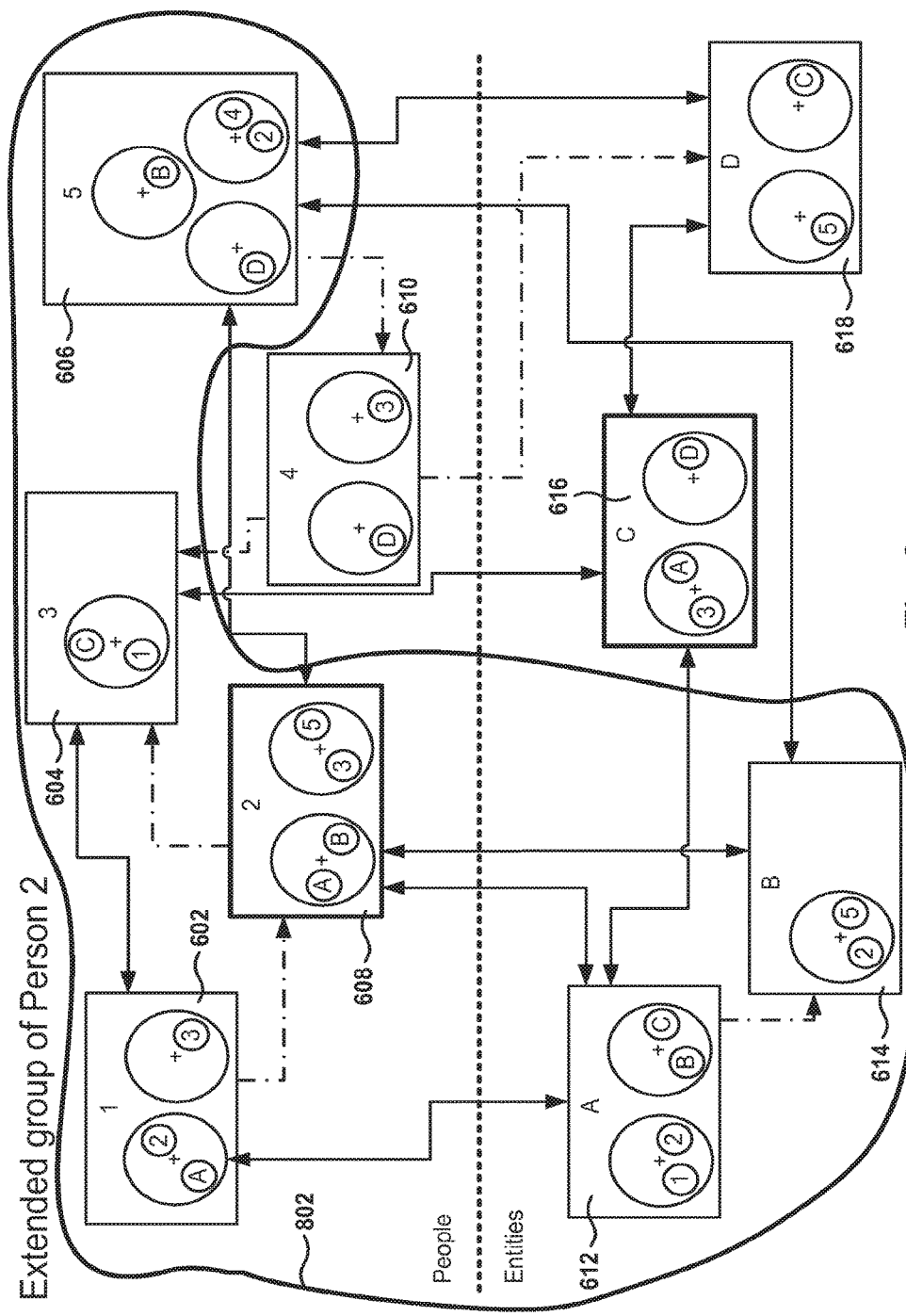
FIG. 8 illustrates a person's extended social group, according to one embodiment.

FIG. 8 illustrates a person's extended social group, according to one embodiment. In one embodiment, the social network provides a feature to allow people to post messages to an extended group, also referred to as extended network, or extended circles. Extended circles might be understood as a circle's circle, that is, the extended circles of a person include the people in the person's circles and the people following the people in the person's circles. In one embodiment, there is a limitation that the people in the extended circles must be visible to the person. A simple way to think of extended circles is to think of a group that includes friends and the friends' friends.

Content shared with extended circles appear in the incoming stream of people who are one degree removed from the person. For example, Nediva is in one of a Mike's circles, and Jadon is in one of Nediva's circles. Mike does not know Jadon, and Jadon is not in any of Mike's circles. If Nediva chooses to have Jadon visible on her profile among the people in her circles, and Mike chooses to share with his extended circles, the content will appear in both Nediva's and Jadon's streams.

In one embodiment, entities are not allowed to do extended-circle posts. If entities were allowed to do extended-circle posts, entities could be posting to people that have not added the entity to the entity's circles. In addition, entities are not included in extended-circle posts initiated by people, unless the entities are directly linked to the person doing the post.

The embodiment of FIG. 8 illustrates the extended group 802 of person 2 608. The extended group 802 includes persons 1, 3, and 5, and entities A and B for the following reasons:

Person 5 is in the extended group because person 5 has a reciprocal relationship with person 2.

Person 1 is in the extended group because person 1 is following person 2.

Person 3 is in the extended group because person 3 is following person 1, which is following person 2.

Person 4 is not in the extended group because person 4 is not following people in the circles of person 2. It is noted that although person 5 has a reciprocal relationship with person 2, and person 5 is following person 4, person 4 is not following person 5. Additionally, person 4 is following person 3, but person 3 is not following person 2.

Entities A and B are in the extended group because person 2 has a direct reciprocal relationship with entities A and B.

Entity C is not in the extended group because person 2 has no relationship with entity uppercase C. Is noted that although entity C has a reciprocal relationship with entity A, the extended group relationship does not propagate through entities.

Entity D is not in the extended group because entity D has no direct relationship with person 2 nor with anybody following person 2.

It should be noted that, if two persons are following the same entity, an extended-circle post will reach the entity. Therefore, the person may not assume that if an extended-circle post is done, it will not reach any brand, because it may reach the brands that the person is following, even if the person does not post to the circle having the brand.

Figure 9:
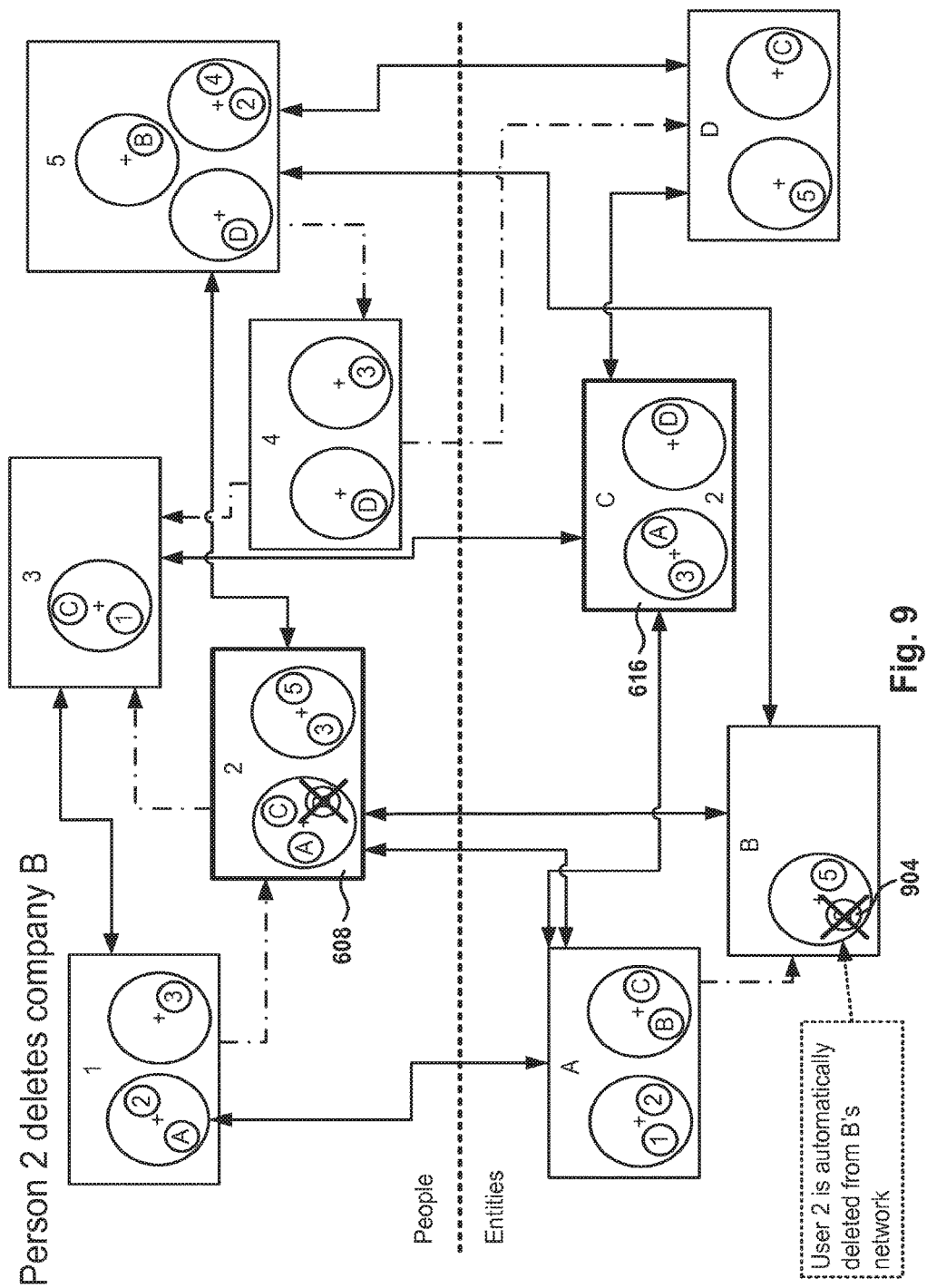
FIG. 9 illustrates the automatic removal of a person from an entity's network, in accordance with one embodiment.

FIG. 9 illustrates the automatic removal of a person from an entity's network, in accordance with one embodiment. When a person removes the entity from all her circles, the reciprocal link, if it exists, is automatically terminated. This means that the person is automatically removed from the entity's circles as well.

FIG. 9 shows that person 2 608 has removed entity B from all her circles. The social network automatically deletes person 2 from B's circles. However, if the brand is later added to a circle of the person, the system restores the previous relationship in the entity's circles. Therefore, the social network will add the person to the entity's circles where the person was previously defined. This is particularly helpful when a person decides to move an entity from one circle to another. If the past history were lost, this would mean that the move would destroy the existing relationship with the entity, although this was probably not the intention of the person.

Figure 10:
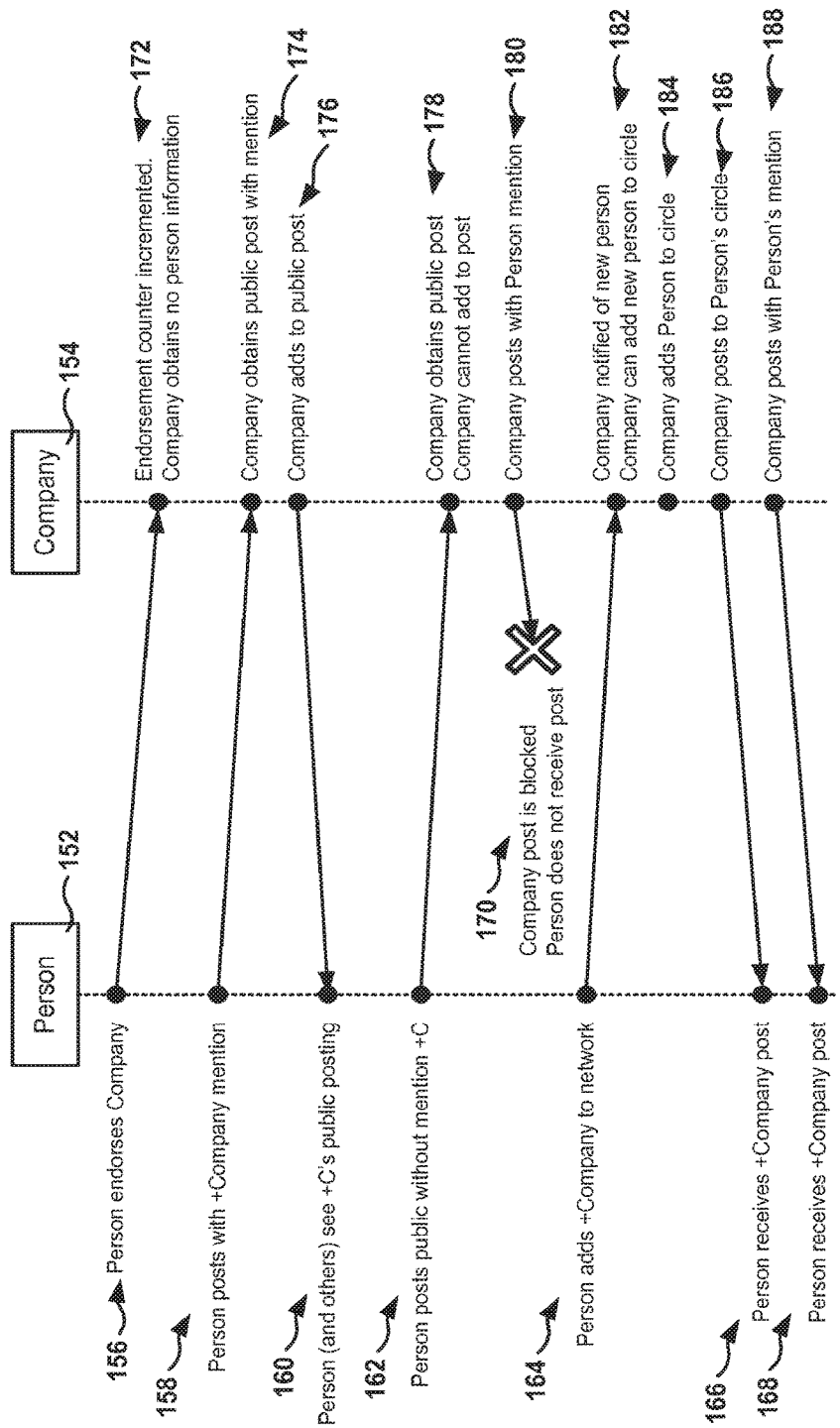
FIG. 10 illustrates the interactions between the person and the company, according to one embodiment.

FIG. 10 illustrates the interactions between a person and a company (e.g., a commercial entity), according to one embodiment. Initially, there is no relationship established in the social network between the person and the company. In operation 156, person 152 endorses company 154. As discussed above, and endorsement is a different operation from an addition of the entity to a person's circles. And endorsement does not open the door in the social network for the company to start posting messages in the person's stream. As a result of the endorsement, the endorsement counter associated with the company is incremented in operation 172. In one embodiment, the company does not obtain any information about the person as a consequence of the endorsement.

The social network provides a way to establish a conversation between a person and an entity, without having to add the entity to a circle. For example, if the person sends a message to the company, the company can send a message back to the person. If the person mentions an entity, or an entity page, the entity can post in the context of the mention, even if the entity is not in the person's circles. A mention of an entity page operates in similar fashion as when a person mentions another person (e.g., by including the '+' symbol before the person's name). Entities will receive a notification of the mention (depending on notification settings, of course). However, an entity can only mention people that have added the entity to their circles.

If an entity mentions a user with and existing relationship with the entity, the user is notified (depending on notification settings). In addition, entities can mention other entities, even if the entities do not have a current follow relationship in the social network. Summarizing, an entity can comment on a person's post it one of the following is true:

1. The post is public and the person has the entity in her circles.
2. The person posts to a circle that includes the entity.
3. The person, or any commenter, invites the entity into the post stream by expressly mentioning the entity in the post stream.

Returning now to FIG. 10, in operation 158, the person makes a post mentioning the company (e.g., "Hello +Company"). Since the company has expressly been mentioned, even though the company does not have a relationship with person yet, the company obtains visibility to the post due to the mention 174. In operation 176, the entity decides to add to the public post (e.g., "Hello Person. I'm glad to hear from you"). The post 176 from company is then reviewed by person in operation 160.

In operation 162, the person makes a public post without mentioning the company. As discussed above, the person has not yet established a relationship in the social network with company 154. In operation 178, the company receives the posts because it was made public. However, the company cannot participate or add to that public post. The company may not post, nor comment, nor endorse the post (e.g., '+1'). For example, if the company attempts 180 to post a comment to the public post, the social network blocks 170 the post from reaching person 152.

In operation 164, person 152 adds company to her social network, e.g., to the one of her circles. Consequently, company gets notified 182 that a new person is following the entity. The company can now add this person to any circle 184. In one embodiment, the person gets automatically added to at least one of the circles defined by company 154.

In operation 186, the company makes a post to a circle that includes person 152. The post is added to the person's stream 166 because person 152 is now following company 154, and a link has been established between person 152 and company 154. Additionally, in operation 188, the company makes a public post with a mention of person 152. Since person and company are now linked, the person receives the public post because the person was mentioned in the post (of course, depending on notification setting configured by person 152).

Figure 11:
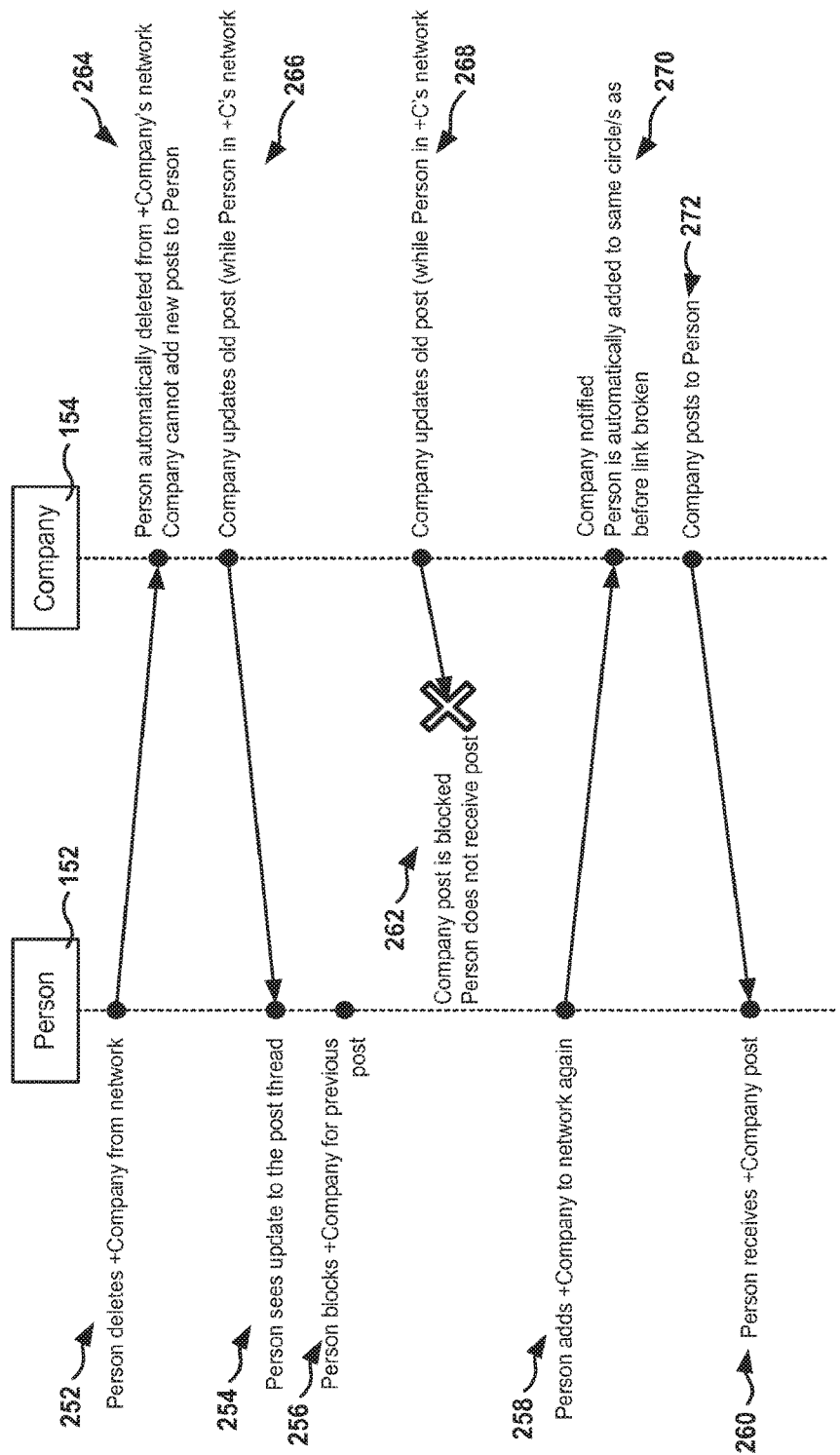
FIG. 11 illustrates additional interactions between the person and the company, according to one embodiment.

FIG. 11 illustrates additional interactions between the person and the company, according to one embodiment. In operation 252, person 152 deletes the entity from her circles. As a result of the deletion, person 152 is automatically deleted from the company's circles. Company 154 cannot add any new posts that will reach person 152. However, in one embodiment, company 154 may still participate in the streams associated with the posts originated before person 152 deleted the entity from her network. Therefore, when company updates, (e.g., adds to) and old post 266, the post is shown in the person's stream 254.

In operation 256, person 152 has decided that she does not want to see any other electronic messages from the company related to the old posts, so person 152 blocks the company from the posts. If the company adds 268 to the old post, which was blocked by person 152, the post is blocked 262 by the social network and will not reach person 152.

In operation 258, person 152 changes her mind and decides to add 258 the company again to one of her circles. As a result, the company gets notified that the user is again following the company, and person 152 is automatically added 270 to the same circles of company 154 that the person belonged to before breaking the follow relationship with the company. In operation 272, the company makes a post to person 152, and because the relationship has been reestablished, person receives the company's post in operation 260.

Figure 12:
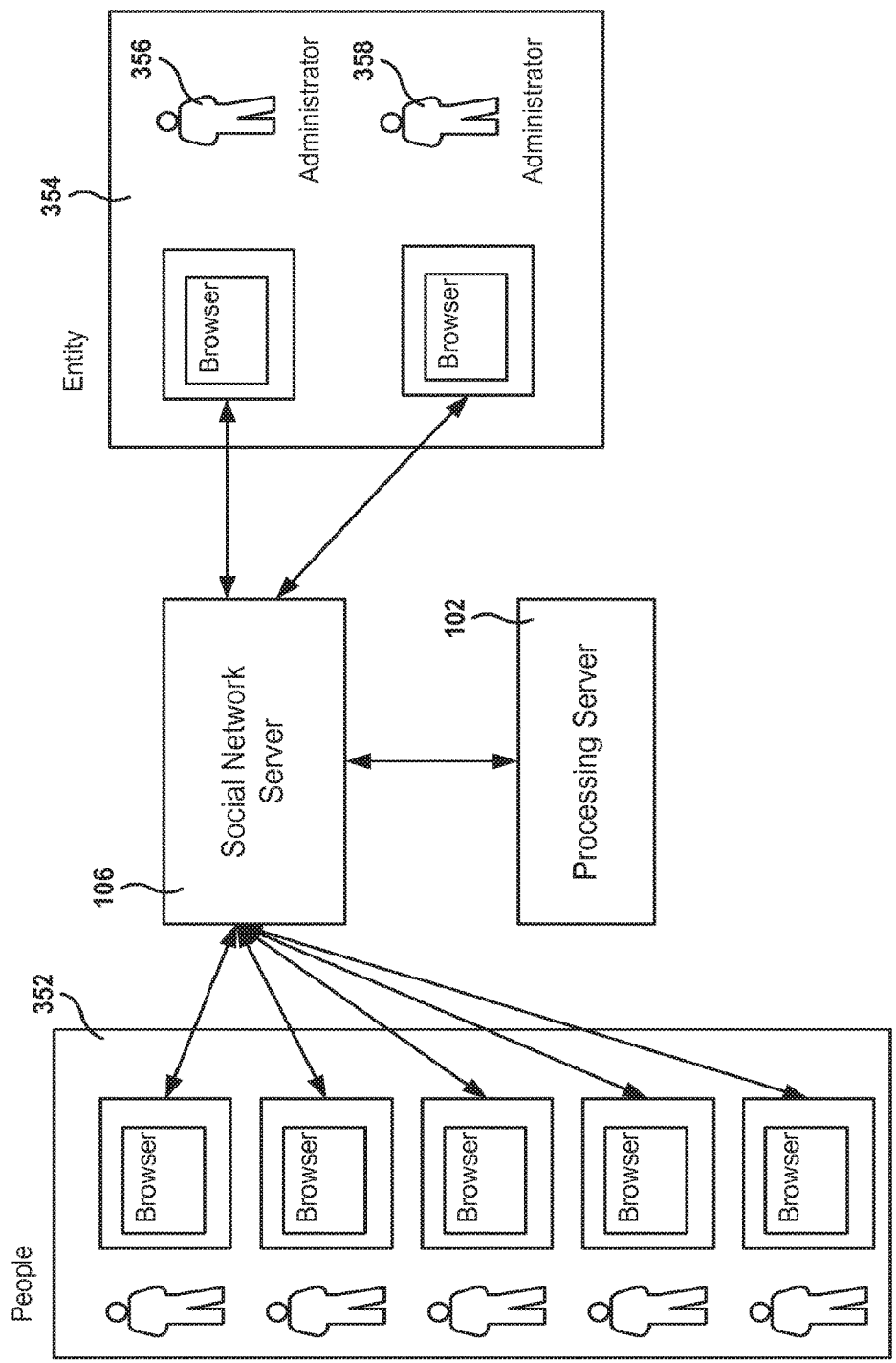
FIG. 12 shows a simplified architecture for implementing embodiments described herein.

FIG. 12 shows a simplified architecture for implementing embodiments described herein. People 352 access the social network 106 utilizing a web browser, or some other similar application (e.g., app in smart phone). Entity 354 includes one or more administrators 356, 358 that access the social network via a network browser or some other similar application or interface provided by the social network.

Processing server 102 manages the rules for establishing social relationships within the network, and the rules for controlling the authorized recipients of messages from any user in the social network. When a request is made to the social network server 106 to establish a new relationship (e.g., to start following another user), the social network forwards the requests to processing server 102, which determines if the request is authorized or denied.

For example, processing server 102 checks if a person may be added to another person's circles, or if a person may be added to an entity's circles. The processing server maintains the list of the possible operations. In one embodiment, processing server 102 provides an Application Programming Interface (API), which is utilized by social network server 106 to perform requests from the processing server 102.

In one embodiment, the rules for enabling the addition of users to a user's network are defined by the following table:

TABLE 1

| New relationship | Person | Entity |
| --- | --- | --- |
| Person | Person may start following another person | Person may start following an entity |
| Entity | Entity may not follow a person, unless the person previously establishes a formal relationship with the entity | Entity may start following another entity |

In one embodiment, the processing server operates at the storage layer, and these rules are enforced at the storage layer. It is appreciated that the embodiments illustrated in FIG. 12 are exemplary. Other embodiments may utilize different rules, different servers, combine the functionality of different servers into one server, distribute the functionality of one server among several servers, etc. The embodiments illustrated in FIG. 12 should therefore not be interpreted to be exclusive or limiting, but rather exemplary or illustrative.

Figure 13:
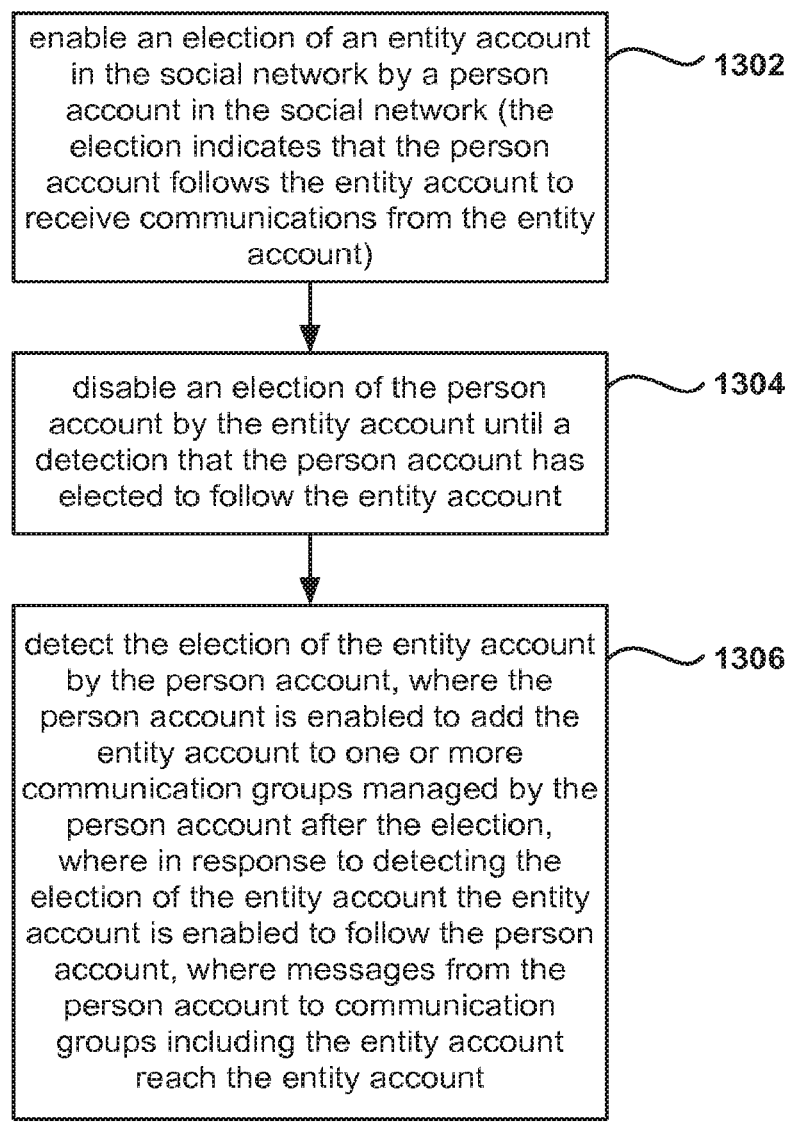
FIG. 13 shows a flowchart illustrating an process for managing the flow of messages among users of a social network, in accordance with one embodiment.

FIG. 13 shows a flowchart illustrating an process for managing the flow of messages among users of a social network, in accordance with one embodiment. In operation 1302, the election of an entity account in the social network by a person account in the social network is enabled. The election indicates that the person account follows the entity account to receive messages from the entity account.

Further, the method includes operation 1304 for disabling an election of the person account by the entity account, until the social network detects that the person account has elected to follow the entity account. From operation 1304, the method flows to operation 1306, where the election of the entity account by the person account is detected. The person account is enabled to add the entity account to one or more messaging groups managed by the person account after the election, where, in response to detecting the election of the entity account, the entity account is enabled to follow the person account. Messages from the person account to messaging groups including the entity account reach the entity account, where at least one operation of the method is executed through a processor.

Figure 14:
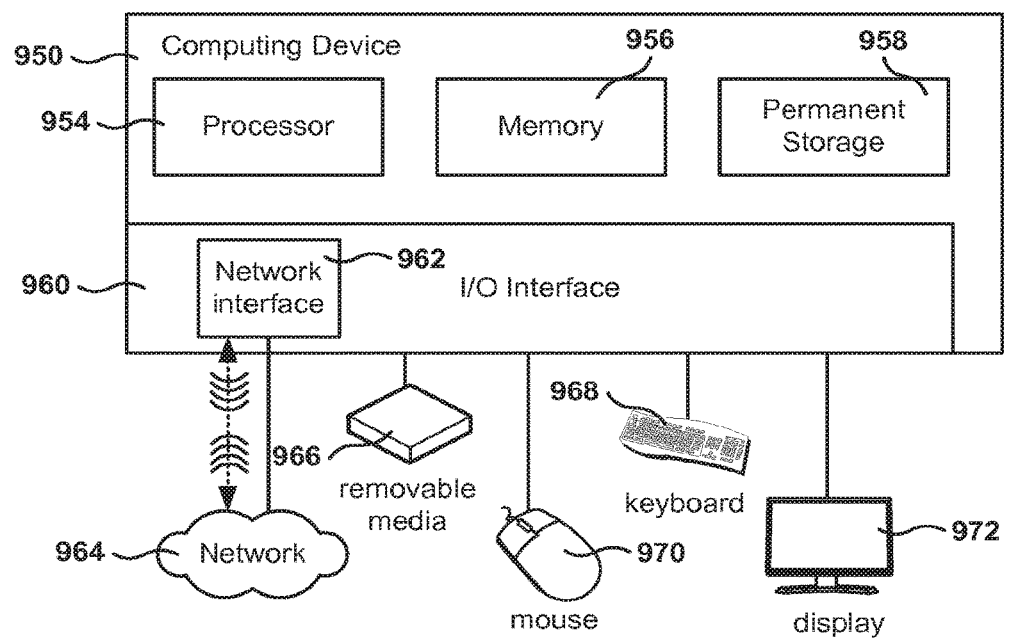
FIG. 14 is a simplified schematic diagram of a computer system for implementing embodiments described herein.

FIG. 14 is a simplified schematic diagram of a computer system for implementing embodiments described herein. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments can also be practiced in distributed computing environments where tasks are performed by remote processing devices that are linked through a wired or a wireless network.

Embodiments can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 14. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:
1. A method comprising:
enabling a person account of a social network to elect to follow an entity account to receive electronic messages from the entity account;
disabling the entity account from electing the person account prior the person account electing to follow the entity account;
detecting an election by the person account of the entity account, wherein the person account adds the entity account to one or more communication groups managed by the person account; and in response to the detecting, enabling the entity account to follow the person account, wherein messages provided by the person account for the one or more communication groups are to reach the entity account, wherein at least one operation of the method is executed through a processor.

2. The method as recited in claim 1 further including:
detecting an election of the person account by the entity account; and enabling the entity account to add the person account to communication groups managed by the entity account.

3. The method as recited in claim 1 further including:
enabling the person account to search for person accounts and for entity accounts.

4. The method as recited in claim 1 further including:
enabling the entity account to search for entity accounts; and disabling the entity account from searching for person accounts.

5. The method as recited in claim 1 further including:
detecting a post created by the person account that mentions the entity account; and enabling the entity account to respond to the post in response to detecting the post.

6. The method as recited in claim 1 further including:
detecting a post created by the person account is free of a mention of the entity account; and
disabling the entity account to respond to the post in response to detecting the post unless the entity account is following the person account.

7. The method as recited in claim 1 further including:
detecting a deletion of the entity account from the person account; and
removing the person account from the entity account in response to detecting the deletion.

8. The method as recited in claim 7 further including:
enabling electronic messages from the entity account related to message streams started before the deletion.

9. The method as recited in claim 7 further including:
detecting a new election by the person account of the entity account after the deletion; and
adding the person account to communication groups of the entity account where the person account existed before the deletion.

10. A non-transitory computer-readable storage medium, having instructions stored therein, which when executed, cause a processor to:
enable a person account of a social network to elect to follow an entity account to receive electronic messages from the entity account;
disable the entity account from electing the person account prior to the person account electing to follow the entity account; and
detect an election by the person account of the entity account, wherein the person account adds the entity account to one or more communication groups managed by the person account; and
in response to the detecting, enable the entity account to follow the person account, wherein messages provided by the person account for the one or more communication groups are to reach the entity account.

11. The non-transitory computer-readable storage medium of claim 10, wherein the processor is further to: enable an endorsement operation, wherein an endorsement of an entity account by a person account increases a value of an endorsement counter associated with the entity account.

12. The non-transitory computer-readable storage medium of claim 11, wherein an endorsement of the entity account by the person account when the person account is not following the entity account maintains communications disabled from the entity account to the person account.

13. The non-transitory computer-readable storage medium of claim 10, wherein the processor is further to: detect a post created by the person account that mentions the entity account; and enable the entity account to respond to the post in response to detecting the post.

14. A system, comprising:
a memory;
a processor, operatively coupled to the memory, the processor to:
enable a person account of a social network to elect follow an entity account to receive electronic messages from the entity account:
disable the entity account from electing the person account prior to the person account electing to follow the entity account; and detect an election by the person account of the entity account, wherein the person account adds the entity account to one or more communication groups managed by the person account; and
in response to the detecting, enable the entity account to follow the person account, wherein messages provided by the person account for the one or more communication groups are to reach the entity account.

15. The system of claim 14, wherein the processor is further to: enable an endorsement operation, wherein an endorsement of an entity account by a person account increases a value of an endorsement counter associated with the entity account.

16. The system of claim 15, wherein an endorsement of the entity account by the person account when the person account is not following the entity account maintains communications disabled from the entity account to the person account.

17. The system of claim 14, wherein the processor is further to: detect a post created by the person account that mentions the entity account; and enable the entity account to respond to the post in response to detecting the post.

18. The system of claim 14, wherein the processor is further to: detect an election of the person account by the entity account; and enable the entity account to add the person account to communication groups managed by the entity account.

19. The system of claim 14, wherein the processor is further to: enable the entity account to search for entity accounts; and disable the entity account to search for person accounts.

20. The system of claim 14, wherein the processor is further to: detect a deletion of the entity account from the person account; and remove the person account from the entity account in response to detecting the deletion.

* * * * *